United States Patent
Kim et al.

(10) Patent No.: US 12,285,997 B2
(45) Date of Patent: Apr. 29, 2025

(54) HEAT PUMP SYSTEM CONTROL METHOD FOR VEHICLE

(71) Applicants: Hyundai Motor Company, Seoul (KR); Kia Corporation, Seoul (KR)

(72) Inventors: Jae Yeon Kim, Hwaseong-si (KR); Wan Je Cho, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 251 days.

(21) Appl. No.: 17/976,551

(22) Filed: Oct. 28, 2022

(65) Prior Publication Data

US 2023/0049156 A1 Feb. 16, 2023

Related U.S. Application Data

(62) Division of application No. 16/675,581, filed on Nov. 6, 2019, now Pat. No. 11,529,848.

(30) Foreign Application Priority Data

Jul. 29, 2019 (KR) .................. 10-2019-0091586

(51) Int. Cl.
*B60H 1/03* (2006.01)
*B60H 1/00* (2006.01)
(Continued)

(52) U.S. Cl.
CPC ......... *B60H 1/034* (2013.01); *B60H 1/00278* (2013.01); *B60H 1/00807* (2013.01);
(Continued)

(58) Field of Classification Search
CPC .............. B60H 1/034; B60H 1/00278; B60H 1/00807; B60H 1/00885; B60H 1/00899; B60H 1/143; B60H 1/3204; B60H 1/3213; B60H 2001/00307; B60H 2001/00928; B60H 2001/00949; B60H 1/00392;
(Continued)

(56) References Cited

U.S. PATENT DOCUMENTS 4,290,416 A * 9/1981 Maloney ................ F24S 60/10
165/47
5,641,016 A  6/1997 Isaji
(Continued)

FOREIGN PATENT DOCUMENTS

CN  108016235 A  5/2018
CN  109094330 A  12/2018
(Continued)

*Primary Examiner* — Ljiljana V. Ciric
(74) *Attorney, Agent, or Firm* — Morgan, Lewis & Bockius LLP

(57) ABSTRACT

A heat pump system for a vehicle includes a first cooling apparatus having a first radiator, a first water pump, an electrical component, a valve, and a branch line, which are connected by a first coolant line and circulate a first coolant by the first water pump to the electrical component; a second cooling apparatus including a second radiator and a second water pump connected by a second coolant line; and an air conditioning apparatus including a compressor, a heater, an expansion valve, and a heat exchanger which are connected by a refrigerant line circulated with a refrigerant.

9 Claims, 2 Drawing Sheets

(51) Int. Cl.
    *B60H 1/14* (2006.01)
    *B60H 1/32* (2006.01)
    *B60L 1/02* (2006.01)
    *B60L 50/50* (2019.01)
(52) U.S. Cl.
    CPC ..... *B60H 1/00885* (2013.01); *B60H 1/00899* (2013.01); *B60H 1/143* (2013.01); *B60H 1/3204* (2013.01); *B60H 1/3213* (2013.01); *B60L 1/02* (2013.01); *B60L 50/50* (2019.02); *B60H 2001/00307* (2013.01); *B60H 2001/00928* (2013.01); *B60H 2001/00949* (2013.01); *B60L 2270/46* (2013.01); *Y02T 10/70* (2013.01)
(58) Field of Classification Search
    CPC ........ B60L 1/02; B60L 50/50; B60L 2270/46; Y02T 10/70
    See application file for complete search history.

(56) References Cited

U.S. PATENT DOCUMENTS

| | | | |
|---|---|---|---|
| 6,321,697 B1 * | 11/2001 | Matsuda | B60L 1/02 123/563 |
| 6,394,210 B2 * | 5/2002 | Matsuda | B60H 1/004 903/903 |
| 7,789,176 B2 * | 9/2010 | Zhou | B60H 1/00885 180/65.1 |
| 7,975,757 B2 * | 7/2011 | Nemesh | H01M 10/6568 165/42 |
| 8,959,936 B2 | 2/2015 | Richter | |
| 9,016,080 B2 | 4/2015 | Brodie | |
| 9,511,645 B2 | 12/2016 | Johnston | |
| 9,533,544 B2 | 1/2017 | Johnston | |
| 9,623,719 B2 | 4/2017 | Hatakeyama | |
| 9,631,872 B2 | 4/2017 | Lombardo | |
| 9,731,576 B2 | 8/2017 | Johnston | |
| 9,731,577 B2 | 8/2017 | Johnston | |
| 9,731,578 B2 | 8/2017 | Johnston | |
| 9,758,010 B2 | 9/2017 | Johnston | |
| 9,758,011 B2 | 9/2017 | Johnston | |
| 9,758,012 B2 | 9/2017 | Johnston | |
| 9,819,063 B2 | 11/2017 | Blatchley | |
| 9,827,824 B2 * | 11/2017 | Enomoto | B60H 1/08 |
| 9,827,846 B2 | 11/2017 | Porras | |
| 9,855,815 B2 * | 1/2018 | Saab | B60H 1/00385 |
| 9,950,638 B2 | 4/2018 | Porras | |
| 10,076,944 B2 | 9/2018 | Jalilevand | |
| 10,099,531 B2 * | 10/2018 | Labaste Mauhe | B60H 1/321 |
| 10,118,458 B2 | 11/2018 | Kim | |
| 10,183,550 B2 * | 1/2019 | Gebbie | B60H 1/00921 |
| 10,449,830 B2 * | 10/2019 | Sugimura | B60H 1/3213 |
| 11,110,772 B2 * | 9/2021 | Oh | B60H 1/00392 |
| 11,155,138 B2 * | 10/2021 | Kim | B60H 1/00492 |
| 11,173,769 B2 * | 11/2021 | Oh | B60H 1/00278 |
| 11,192,429 B2 * | 12/2021 | Oh | B60L 58/26 |
| 11,207,939 B2 * | 12/2021 | Johnston | B60H 1/143 |
| 11,207,940 B2 * | 12/2021 | Lee | B60H 1/00278 |
| 11,305,607 B2 * | 4/2022 | Kim | B60H 1/00921 |
| 11,325,444 B2 * | 5/2022 | Kim | B60H 1/00921 |
| 11,325,445 B2 * | 5/2022 | Kim | B60H 1/00392 |
| 11,351,838 B2 * | 6/2022 | Kim | B60H 1/00485 |
| 11,358,435 B2 * | 6/2022 | Kim | B60H 1/00785 |
| 11,376,921 B2 * | 7/2022 | Kim | B60H 1/00921 |
| 11,383,577 B2 * | 7/2022 | Lee | B60L 58/26 |
| 11,407,273 B2 * | 8/2022 | Kim | B60H 1/3232 |
| 11,413,929 B2 * | 8/2022 | Kim | B60H 1/2221 |
| 11,427,050 B2 * | 8/2022 | Kim | B60H 1/00278 |
| 11,458,812 B2 * | 10/2022 | Jeong | B60H 1/00907 |
| 11,499,757 B2 * | 11/2022 | Kozasa | F28D 1/0461 |
| 11,529,844 B2 * | 12/2022 | Kim | B60H 1/00885 |
| 11,529,848 B2 * | 12/2022 | Kim | B60H 1/00278 |
| 11,597,375 B2 * | 3/2023 | Sugihara | B60W 10/06 |
| 11,634,004 B2 * | 4/2023 | Kim | B60H 1/323 62/259.2 |
| 11,707,964 B2 * | 7/2023 | Miyakoshi | H01M 10/613 62/208 |
| 11,959,668 B2 * | 4/2024 | Lee | B60H 1/143 |
| 2008/0251235 A1 * | 10/2008 | Zhou | B60L 58/26 165/59 |
| 2009/0249807 A1 | 10/2009 | Nemesh | |
| 2010/0012295 A1 * | 1/2010 | Nemesh | H01M 10/6568 165/104.19 |
| 2011/0174000 A1 | 7/2011 | Richter | |
| 2011/0296855 A1 | 12/2011 | Johnston | |
| 2012/0180997 A1 | 7/2012 | Johnston | |
| 2012/0183815 A1 | 7/2012 | Johnston | |
| 2012/0234518 A1 * | 9/2012 | Brodie | F28D 20/028 165/104.31 |
| 2012/0318012 A1 | 12/2012 | Choi | |
| 2013/0269911 A1 | 10/2013 | Carpenter | |
| 2014/0338376 A1 | 11/2014 | Carpenter | |
| 2015/0129161 A1 | 5/2015 | Nishikawa | |
| 2015/0202986 A1 | 7/2015 | Hatakeyama | |
| 2015/0217622 A1 | 8/2015 | Enomoto | |
| 2015/0217623 A1 | 8/2015 | Hatakeyama | |
| 2015/0258875 A1 | 9/2015 | Enomoto | |
| 2015/0308719 A1 | 10/2015 | Gebbie | |
| 2016/0031340 A1 | 2/2016 | Porras | |
| 2016/0107501 A1 | 4/2016 | Johnston | |
| 2016/0107502 A1 | 4/2016 | Johnston | |
| 2016/0107503 A1 | 4/2016 | Johnston | |
| 2016/0107504 A1 | 4/2016 | Johnston | |
| 2016/0107505 A1 | 4/2016 | Johnston | |
| 2016/0107506 A1 | 4/2016 | Johnston | |
| 2016/0107507 A1 | 4/2016 | Johnston | |
| 2016/0107508 A1 | 4/2016 | Johnston | |
| 2016/0221413 A1 | 8/2016 | Gebbie | |
| 2016/0318373 A1 | 11/2016 | Kang | |
| 2016/0339767 A1 | 11/2016 | Enomoto | |
| 2017/0008407 A1 | 1/2017 | Porras | |
| 2017/0054188 A1 | 2/2017 | Blatchley | |
| 2017/0158081 A1 | 6/2017 | Kim | |
| 2017/0197488 A1 | 7/2017 | Kim | |
| 2017/0217279 A1 | 8/2017 | Jalilevand | |
| 2017/0240024 A1 | 8/2017 | Blatchley | |
| 2017/0267063 A1 | 9/2017 | Shan | |
| 2017/0361676 A1 | 12/2017 | Androulakis | |
| 2017/0361677 A1 | 12/2017 | Kim | |
| 2018/0001784 A1 | 1/2018 | Porras | |
| 2018/0050605 A1 | 2/2018 | Lewis | |
| 2018/0072130 A1 | 3/2018 | Kim | |
| 2018/0117985 A1 | 5/2018 | Kim | |
| 2018/0117986 A1 | 5/2018 | Kim | |
| 2018/0117991 A1 | 5/2018 | Kim et al. | |
| 2018/0208014 A1 | 7/2018 | Ben Ahmed | |
| 2018/0208061 A1 | 7/2018 | Ben Ahmed | |
| 2018/0229584 A1 | 8/2018 | Cosgrove et al. | |
| 2018/0264913 A1 | 9/2018 | Enomoto | |
| 2018/0281562 A1 | 10/2018 | Spies | |
| 2018/0312035 A1 | 11/2018 | Koberstein | |
| 2018/0339574 A1 | 11/2018 | Sugimura | |
| 2018/0361828 A1 | 12/2018 | Kato | |
| 2021/0031592 A1 * | 2/2021 | Kim | B60H 1/00278 |
| 2021/0252942 A1 * | 8/2021 | Jeong | B60H 1/3213 |
| 2021/0370747 A1 * | 12/2021 | Lee | F25B 41/24 |
| 2021/0379962 A1 * | 12/2021 | Kim | B60H 1/005 |
| 2022/0048359 A1 * | 2/2022 | Kim | B60H 1/00921 |
| 2022/0052390 A1 * | 2/2022 | Kim | H01M 10/663 |
| 2022/0111698 A1 * | 4/2022 | Kim | B60H 1/00007 |
| 2022/0161630 A1 * | 5/2022 | Lindquist | B60L 1/003 |
| 2022/0212517 A1 * | 7/2022 | Yu | B60H 1/00392 |
| 2022/0266651 A1 * | 8/2022 | Jeong | B60H 1/2221 |
| 2022/0281285 A1 * | 9/2022 | Kim | B60H 1/00392 |
| 2023/0049156 A1 * | 2/2023 | Kim | B60H 1/00807 |

FOREIGN PATENT DOCUMENTS

| | | |
|---|---|---|
| CN | 109386369 A | 2/2019 |
| CN | 109720165 A | 5/2019 |
| CN | 109760483 A | 5/2019 |

(56) References Cited

FOREIGN PATENT DOCUMENTS

| JP | H 7-69039 A | 3/1995 |
|---|---|---|
| JP | 3275349 B2 | 4/2002 |
| JP | 2011-31876 A | 2/2011 |
| JP | 5223837 B2 | 6/2013 |
| JP | 2013-139251 A | 7/2013 |
| KR | 10-2013-0100715 A | 9/2013 |
| KR | 10-2016-0048237 A | 5/2016 |
| KR | 10-2018-0091978 A | 8/2018 |
| KR | 10-2020-0142617 A | 12/2020 |
| WO | WO 2013-084465 A1 | 6/2013 |
| WO | WO 2013-087425 A1 | 6/2013 |

* cited by examiner

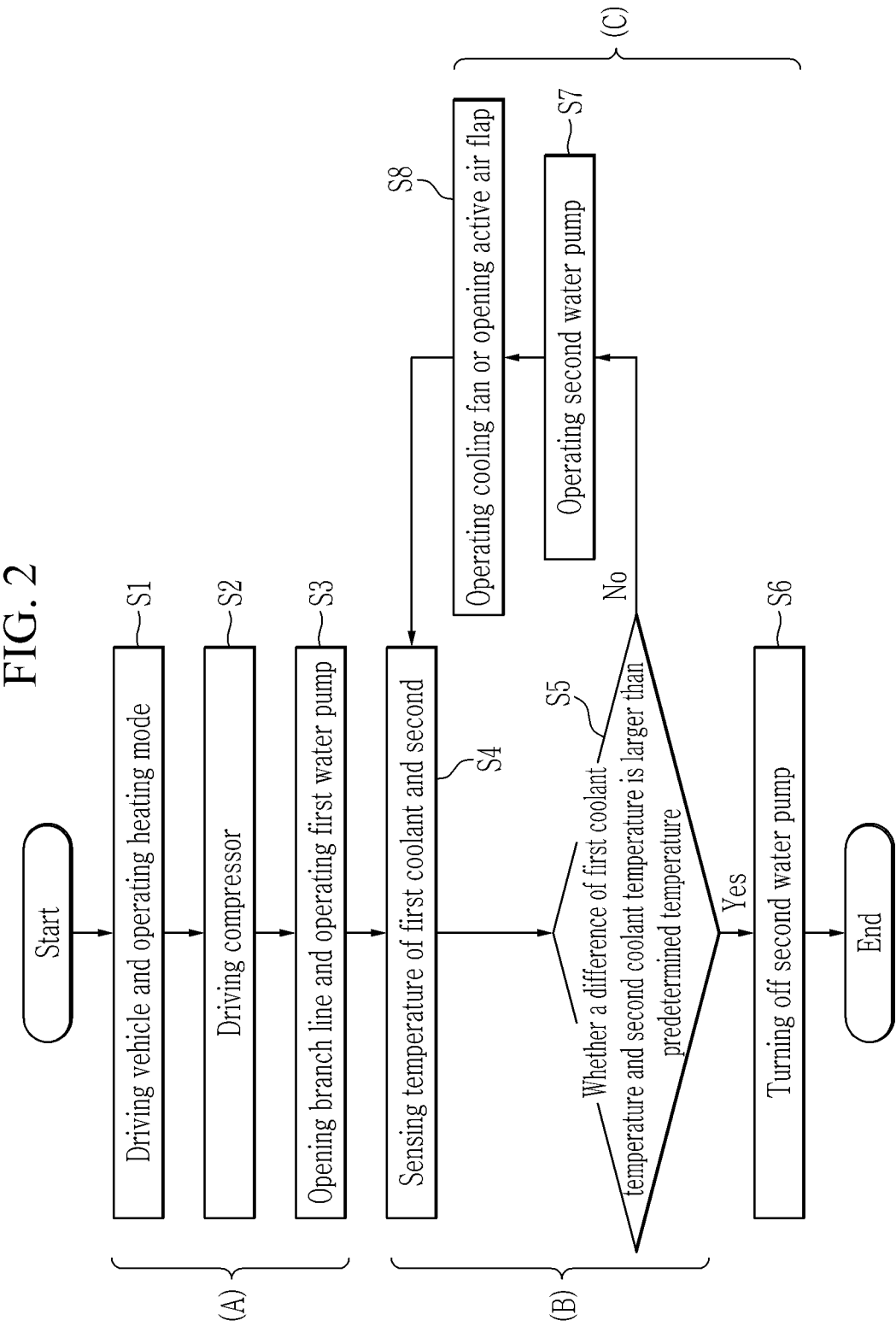

HEAT PUMP SYSTEM CONTROL METHOD FOR VEHICLE

CROSS-REFERENCE TO RELATED APPLICATION

The present application is a Divisional of U.S. patent application Ser. No. 16/675,581, filed Nov. 6, 2019, which claims priority to Korean Patent Application No. 10-2019-0091586 filed on Jul. 29, 2019, the entire contents of which is incorporated herein for all purposes by this reference.

BACKGROUND OF THE INVENTION

Field of the Invention

The present invention relates to a method for controlling a heat pump system for a vehicle, and more particularly, to a method for controlling a heat pump system for a vehicle in which heat from an external heat source is selectively recovered to be used in a heating mode while recovering thermal energy generated from an electrical component in an electric vehicle.

Description of Related Art

A vehicle includes an air conditioning system as an air conditioner to heat or cool an interior of a vehicle.

The air conditioning system, which is to maintain the interior of the vehicle at an appropriate temperature regardless of a change in an external temperature to maintain a comfortable internal environment, is configured to heat or cool the interior of the vehicle through heat exchange by an evaporator in a process in which a refrigerant discharged by driving of a compressor is circulated to the compressor through a condenser, a receiver drier, an expansion valve, and the evaporator.

That is, the air conditioning system lowers a temperature and a humidity of the interior by condensing a high-temperature high-pressure gas-phase refrigerant compressed from the compressor by the condenser, passing the refrigerant through the receiver drier and the expansion valve, and then evaporating the refrigerant in the evaporator in a cooling mode in summer.

Recently, as interest in energy efficiency and an environmental contamination problem is increased day by day, there is a demand for developing an environmentally friendly vehicle which is configured for substantially replacing an internal combustion engine vehicle, and the environmentally friendly vehicle is commonly divided into an electric vehicle which is driven by use of a fuel cell or electricity as a power source, and a hybrid vehicle which is driven by use of an engine and an electric battery.

Here, the air conditioning system applied to the electric vehicle has a characteristic of lowering the temperature and humidity of the interior by condensing a high-temperature high-pressure gas-phase refrigerant compressed from the compressor by the condenser, passing the refrigerant through the receiver drier and the expansion valve, and then evaporating the refrigerant in the evaporator in a cooling mode in summer, which is the same as a general principle, but using a gaseous coolant of a high temperature and high pressure as a heater medium in a heating mode in winter.

However, the air conditioner system applied to the conventional electric vehicle as described above may increase the temperature of the air blown into the vehicle interior by use of an electric heater provided in a heating, ventilation, and air conditioning (HVAC) module during the heating mode operation of the winter user. Accordingly, there is a problem that the charge amount of the battery is reduced because the electric heater supplied with a power source from the battery is excessively used.

Furthermore, it is difficult to efficiently manage the battery, which shortens the entire travel distance of the vehicle, deteriorating the commerciality of the electric vehicle.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a control method of a heat pump system for minimizing a usage amount of an electric heater by recovering thermal energy generated from an electrical component when running in an electric vehicle and selectively recovering heat of an external heat source when the heat source is insufficient to be used in a heating mode of the vehicle.

The control method of the heat pump system for the vehicle according to an exemplary embodiment of the present invention to be used for heating the vehicle by selectively recovering thermal energy generated from the electrical component and an external heat source when the vehicle is running, in a heat pump system including: a first cooling apparatus including a first radiator, a first water pump, an electrical component, a valve, and a branch line, which are connected by a first coolant line and circulate a first coolant by the first water pump to the electrical component; a second cooling apparatus including a second radiator and a second water pump connected by a second coolant line; and an air conditioning apparatus including a compressor, a heater, an expansion valve, and a heat exchanger which are connected by a refrigerant line circulated with a refrigerant, and the heat exchanger is connected to the first and second coolant lines respectively, and is controlled by a controller, includes: (A) a process of performing heating of a vehicle interior when the vehicle is running and operating the first cooling apparatus; (B) a process of detecting a temperature of a first coolant circulated in the first cooling apparatus and a temperature of a second coolant in the second cooling apparatus and determining whether a difference value of the first coolant temperature and the second coolant temperature is higher than a predetermined temperature; and (C) a process of controlling operation of the second water pump and finishing the control by comparing the difference value of the temperature of the first coolant and the temperature of the second coolant with the predetermined temperature through the process (B).

The process (A) may include: starting, by the controller, the heating of the vehicle according to an operation or setting of a user during driving of the vehicle by the controller; operating the compressor of the air conditioning apparatus by the controller; and controlling the valve by the controller to open the branch line and to operate the first water pump.

If a heating mode of the vehicle is performed, in the state that the first coolant line connected to the branch line and the electrical component are connected to each other, the valve may close the first coolant line connected to the first radiator by a control signal of the controller to stop an inflow of the coolant to the first radiator.

The process (B) may include: detecting a temperature of the first and second coolants by the controller through an output signal output from the first and second coolant temperature sensors; and determining whether a difference value of the temperature of the first coolant and the temperature of the second coolant is higher than a predetermined temperature.

The first coolant temperature sensor may detect the temperature of the first coolant circulated in the first cooling apparatus, and the second coolant temperature sensor may detect the temperature of the second coolant circulated in the second cooling apparatus.

In the step of determining whether the difference of the first coolant temperature and the second coolant temperature is higher than the predetermined temperature, if the condition is satisfied, the process (C) may include maintaining a state in which an operation of the second water pump is interrupted or the operation of the second water pump is stopped or finishing the control.

In the step of determining whether the difference of the first coolant temperature and the second coolant temperature is higher than the predetermined temperature, if the condition is not satisfied, the process (C) may include operating the second water pump.

In the process (C), after operating the second water pump, the control method may further include operating a cooling fan mounted at the rear of the first radiator or opening an active air flap provided in the vehicle at the front of the second radiator, and returning the control method to the process (B).

The heat exchanger recovers the thermal energy from the first and second coolants inflowed through the first and second coolant lines in the heating mode of the vehicle, increasing the temperature of the coolant by use of the recovered heat energy.

As above-described, according to the control method of the heat pump system for the vehicle according to an exemplary embodiment of the present invention, when driving the electric vehicle, the thermal energy generated from the electrical component is recovered, and when the heat source is insufficient, the heat from the external heat source is selectively recovered to be used to the heating mode of the vehicle, minimizing of the usage amount of the electric heater.

Furthermore, the present invention prevents excessive power consumption of the electric heater, increasing the overall travel distance of the vehicle through efficient management of the battery, and also reduces the battery charging cost by preventing unnecessary power consumption.

Furthermore, the present invention improves overall marketability by increasing the travel distance of the vehicle and reducing the battery charging cost.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a control flowchart to explain a control method of a heat pump system for a vehicle according to an exemplary embodiment of the present invention is applied.

Figure 1:
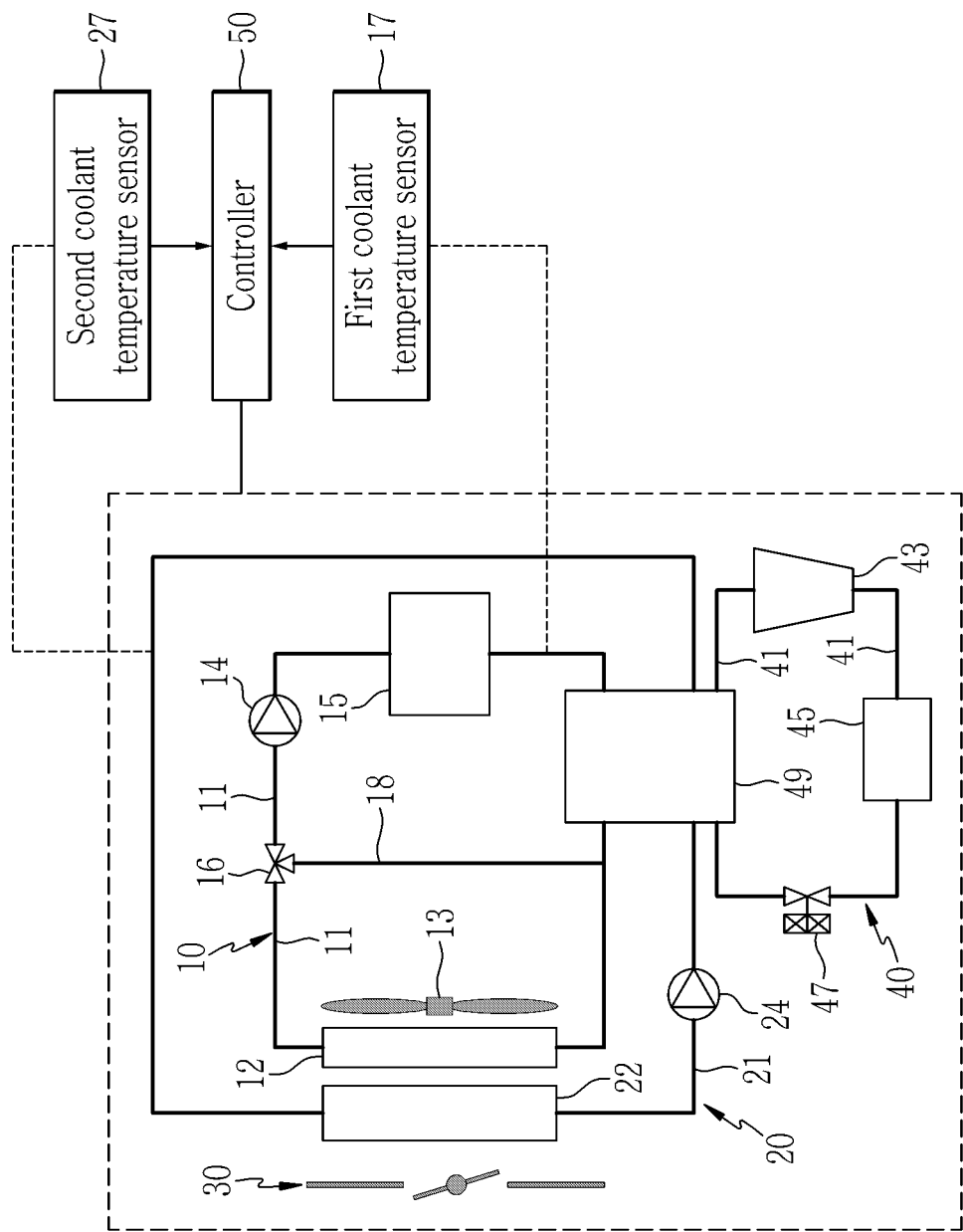
FIG. 1 is a block diagram of a heat pump system to which a control method of a heat pump system for a vehicle according to an exemplary embodiment of the present invention is applied.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

An exemplary embodiment of the present invention will hereinafter be described in detail with reference to the accompanying drawings.

Exemplary embodiments described in the exemplary embodiment and configurations shown in the drawings are just the most preferable exemplary embodiments of the present invention, but do not limit the spirit and scope of the present invention. Therefore, it should be understood that there may be various equivalents and modifications capable of replacing them at the time of filing of the present application.

To clarify the present invention, parts that are not connected with the description will be omitted, and the same elements or equivalents are referred to by the same reference numerals throughout the specification.

The size and thickness of each element are arbitrarily shown in the drawings, but the present invention is not necessarily limited thereto, and in the drawings, the thickness of layers, films, panels, regions, etc., are exaggerated for clarity.

Throughout this specification and the claims which follow, unless explicitly described to the contrary, the word "comprise" or variations such as "comprises" or "comprising" will be understood to imply the inclusion of stated elements but not the exclusion of any other elements.

Furthermore, the terms, ". . . unit", ". . . mechanism", ". . . portion", ". . . member", etc. used herein mean a unit of inclusive components performing at least one or more functions or operations.

FIG. 1 is a block diagram of a heat pump system to which a control method of a heat pump system for a vehicle according to an exemplary embodiment of the present invention is applied, and FIG. 2 is a control flowchart to explain a control method of a heat pump system for a vehicle according to an exemplary embodiment of the present invention.

Referring to FIG. 1, a control method of a heat pump system for a vehicle according to an exemplary embodiment of the present invention is controlled by a controller 50, and is applied to a heat pump system including an air conditioning apparatus 40 to which first and second cooling apparatuses 10 and 20 are interconnected in an electric vehicle.

Here, the controller 50 may be electrically connected to first and second coolant temperature sensors 17 and 27, respectively, to confirm a temperature of a first coolant in the first cooling apparatus 10 and a temperature of a second coolant in the second cooling apparatus 20.

That is, the first coolant temperature sensor 17 may detect the temperature of the first coolant circulated in the first cooling apparatus 10 and the second coolant temperature sensor 27 may detect the temperature of the second coolant circulated in the second cooling apparatus 20 to be output to the controller 50.

In the exemplary embodiment of the present invention, the cooling apparatus 10 includes a first water pump 14 circulating the coolant to an electrical component 15 mutually connected by a first coolant line 11, a first radiator 12 and a cooling fan 13 mounted at a front of the vehicle to cool the first coolant through heat exchange with external air, a valve 16, and a branch line 18.

Here, the electrical component 15 may include an electric power control unit (EPCU) and an on-board charger (OBC).

Also, one end portion of the branch line 18 is connected to the valve 16 mounted at the first coolant line 11 between the first radiator 12 and the first water pump 14, and the other end portion thereof is connected to the first coolant line 11 between the first radiator 12 and the electrical component 15.

Accordingly, when the first branch line 18 is open through operation of the valve 16 in the heating mode of the vehicle, the first branch line 18 again circulates the first coolant passing through the electrical component 15 to the electrical component 15 without passing through the first radiator 12, raising the temperature of the first coolant.

In the instant case, if the heating mode of the vehicle is performed, in the state that the first coolant line 11 connected to the branch line 18 and the electrical component 15 are connected to each other, the valve 16 may close the first coolant line 11 connected to the first radiator 12 by the control signal of the controller 50 to stop the inflow of the coolant to the first radiator 12.

In the exemplary embodiment of the present invention, the second cooling apparatus 20 includes a second radiator 22 and a second water pump 24 which are connected by a second coolant line 21. The second radiator 22 may be mounted at the front of the first radiator 12.

Also, the air conditioning apparatus 40 may include a compressor 43, a heater 45, an expansion valve 47, and a heat exchanger 49 that are connected by a refrigerant line 41 to which the refrigerant is circulated.

First, the compressor 43 compresses the refrigerant of the gas state inflowed through the refrigerant line 41 with high temperature/high pressure.

The heater 45 is an internal condenser provided inside the non-illustrated HVAC module, and is connected to the compressor 43 through the refrigerant line 41, condensing the refrigerant supplied by the compressor 43 through heat exchange with external air.

The heater 45 may heat the interior of the vehicle by inflowing the outside air having the elevated temperature while being heat exchanged with the high temperature/high pressure coolant inflowed to the inside.

The expansion valve 47 is provided on the refrigerant line 41 between the heater 45 and the heat exchanger 49. This expansion valve 47 may expand the coolant in the vehicle's heating mode and flow it into the heat exchanger 49.

The heat exchanger 49 is connected to the refrigerant line 41 to allow the coolant to pass therethrough, and is respectively connected to the first and second coolant lines 11 and 21 to respectively pass through the first and second coolants circulating in the first and second cooling apparatus 10 and 20.

Here, the heat exchanger 49 may condense or evaporate the refrigerant through heat exchange with the first and second coolants supplied through the first and second coolant lines 11 and 21 according to the cooling mode or the heating mode of the vehicle. The heat exchanger 49 may be a water-cooled heat exchanger in which the coolant flows.

That is, the heat exchanger 49 may evaporate the refrigerant when the expansion valve 47 expands the refrigerant and condense the refrigerant when the expansion valve 47 flows in the refrigerant without expanding the refrigerant.

Meanwhile, the heat exchanger 49 may recover thermal energy from the first and second coolants flowing through the first and second coolant lines 11 and 21 in the vehicle's heating mode, and increase the temperature of the refrigerant by use of the recovered heat energy.

That is, the heat exchanger 49 may recover thermal energy from the first coolant of which the temperature is increased while circulating through the electrical component 15 without the passing through the first radiator 12 along the first coolant line 11 and the branch line 18 through operation of the valve 16 in the heating mode of the vehicle, and increase the temperature of the refrigerant by use of the recovered heat energy.

Furthermore, if the heat source of the electrical component 15 is insufficient in the heating mode at the beginning of the driving of the vehicle, the heat exchanger 49 may recover the thermal energy from the second coolant of which the temperature is increased by absorbing the heat of the external heat source while passing through the second radiator 22 in the second cooling apparatus 20, and may increase the temperature of the refrigerant by use of the thermal energy recovered from the first and second coolants.

In other words, the heat exchanger 49 may recover thermal energy from the first and second coolants of which the temperature is increased by absorbing the waste heat and heat from the external heat source of the electrical component 15, and may simultaneously evaporate the refrigerant by use of the first and second coolants of which the temperature is elevated, the temperature of the refrigerant may be efficiently increased.

The refrigerant of which the temperature rises in the heat exchanger 49 may be supplied to the compressor 43.

On the other hand, the air conditioning apparatus 40 may further include another non-illustrated expansion valve and an evaporator provided inside the HVAC module and connected to the refrigerant line 41.

The other expansion valve receives and expands the refrigerant exhausted from the heat exchanger 49 in the vehicle's cooling mode, and supplies the expanded refrigerant to the non-illustrated evaporator.

The evaporator cools the outside air while evaporating the expanded refrigerant through heat exchange with the outside air. The cooled outside air flows into the interior of the vehicle, cooling the interior of the vehicle.

The control method of the heat pump system configured as described above may be used when heating the vehicle by selectively recovering thermal energy generated from the electrical component 15 and the external heat source when the vehicle is driven.

The control method of the heat pump system configured as described above to be used when heating the vehicle by selectively recovering thermal energy generated from the electrical component 15 and the external heat source when the vehicle is driven includes: a process A of heating the vehicle interior while the vehicle is running and operating the first cooling apparatus 10; a process B of detecting the temperature of the first coolant circulated in the first cooling apparatus 10 and the temperature of the second coolant in the second cooling apparatus 20 and determining whether a difference value of the first coolant temperature and the second coolant temperature is higher than a predetermined temperature; and a process C of controlling an operation of the second water pump 24 by comparing the difference value of the first coolant temperature and the second coolant temperature with the predetermined temperature through the process B and finishing the control.

First, in the process A, the controller 50 operates the heating mode of the vehicle according to the operation or setting of the user while the vehicle is driving (S1).

The controller 50 then operates the compressor 43 to circulate the refrigerant in the air conditioning apparatus 40 (S2).

Furthermore, the controller 50 controls the valve 16 to open the branch line 18 and to operate the first water pump 14 (S3).

That is, the valve 16 may connect the first coolant line 11 and the branch line 18 connected to the electrical component 15, and may prevent the first coolant from inflowing to the first coolant line 11 connected to the first radiator 12.

Thus, the first coolant may be supplied to the heat exchanger 49 along the branch line 18 and the first coolant line 11 that are open through operation of the first water pump 14 in the state that it is heated while circulating through the electrical component 15 without passing through the first radiator 12.

Here, the first coolant is raised in temperature by heat exchange with thermal energy generated from the electrical component 14 while the vehicle is running.

Accordingly, in the heat exchanger 49, the thermal energy may be recovered from the first coolant inflowed through the first coolant line 11 and having the increased temperature.

In the process B, the controller 50 detects the temperature of the first and second coolants through the output signal output from the first and second coolant temperature sensors 17 and 27.

Accordingly, the controller 50 determines whether the difference value between the first coolant temperature and the second coolant temperature is higher than the predetermined temperature (S5).

Also, in the step (S5) of determining whether the difference value between the first coolant temperature and the second coolant temperature is higher than the predetermined temperature, if the condition is satisfied, the process C maintains the state in which the operation of the second water pump 24 is interrupted and the operation of the second water pump 24 is stopped (S6), and finishes the control.

That is, when the thermal energy recovered from the electrical component 15 is sufficient during the initial driving of the vehicle, the heating mode of the vehicle may be smoothly performed by use of the heat of the waste heat source of the electrical component 15 without the operation of the second cooling apparatus 20.

In contrast, in the step (S5) of determining whether the difference value of the temperature of the first coolant and the temperature of the second coolant is higher than the predetermined temperature, if the condition is not satisfied, the controller 50 operates the second water pump 24 (S7).

Next, the controller 50 may open the cooling fan 13 mounted at the rear of the first radiator 12 or an active air flap 30 provided in the vehicle at the front of the second radiator 22 (S8), and may returned to the process B.

That is, when the thermal energy recovered from the electrical component 15 is insufficient during the initial driving of the vehicle, the controller 50 circulates the second coolant through operation of the second water pump 24 to absorb the heat of the external heat source through the second radiator 22.

Thus, the second coolant absorbs the heat of the external heat source through heat exchange with the outside air while passing through the second radiator 22 by the operation of the cooling fan 13, or the open active air flap 30.

The heat of the external heat source absorbed in the second coolant may be recovered through heat exchange with the refrigerant while passing through the heat exchanger 49, and the temperature of the refrigerant passing through the heat exchanger 49 along with the heat of the waste heat source of the electrical component 15 may be increased.

The refrigerant having the elevated temperature passes through the heater 45 in the state that it is compressed to a high temperature/high pressure while passing through the compressor 43, facilitating heating of the vehicle interior.

That is, in the exemplary embodiment of the present invention, when the waste heat source of the electrical component 15 is insufficient, the heat of the external heat source may be recovered together, the heating mode of the vehicle may be smoothly and efficiently performed.

On the other hand, after performing the step (S8), the process is returned to the process B and each above-described step is repeated.

Here, in the step (S5) of determining whether the difference value of the temperature of the first coolant and the temperature of the second coolant is higher than the predetermined temperature, if the condition is satisfied, the controller 50 may stop the operation of the second water pump 24 and finish the control.

At the same time, the controller 50 may shut down the operation of the cooling fan 13 or close the open active air flap 30.

That is, while each above-described step is performed, the controller 50 recovers the thermal energy generated from the electrical component 15 if heating is required during the driving of the vehicle or at the beginning of the driving, and recovers the heat of the external heat source through operation of the second cooling apparatus 20 when the waste heat source of the electrical component 15 is insufficient to be used together for heating, it is possible to minimize the operation of an electric heater operated by power supplied from a non-illustrated battery. At the same time, the usage amount of battery may be reduced.

As above-described, if the control method of the heat pump system for the vehicle according to an exemplary embodiment of the present invention is applied, the thermal energy generated from the electrical component 15 during the driving in the electric vehicle is recovered and the heat of the external heat source is selectively recovered when the heat source is insufficient to be used in the heating mode of the vehicle, minimizing the usage amount of the electric heater.

Furthermore, the present invention prevents excessive power consumption of the electric heater, increasing the overall travel distance of the vehicle through the efficient management of the battery, and it is possible to reduce the battery charging cost by preventing unnecessary power consumption.

Furthermore, the present invention may improve the overall marketability by increasing the travel distance of the vehicle and reducing the battery charging cost.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A heat pump system for a vehicle to be used for heating the vehicle by selectively recovering thermal energy generated from an electrical component and an external heat source when the vehicle is running, the heat pump system comprising:
   a first cooling apparatus including a first radiator, a first water pump, the electrical component, a valve, and a branch line, which are connected by a first coolant line, wherein a first coolant is circulated by the first water pump to the electrical component;
   a second cooling apparatus including a second radiator and a second water pump connected by a second coolant line;
   an air conditioning apparatus including a compressor, a heater, an expansion valve, and a heat exchanger which are connected by a refrigerant line circulated with a refrigerant, wherein the heat exchanger is connected to the first and second coolant lines respectively; and
   a controller configured for controlling the heat pump system,
   wherein the controller is further configured for:
      performing heating of a vehicle interior when the vehicle is running and operating the first cooling apparatus;
      detecting a temperature of a first coolant circulated in the first cooling apparatus and a temperature of a second coolant in the second cooling apparatus and determining when a difference value of the first coolant temperature and the second coolant temperature is higher than a predetermined temperature; and
      controlling operation of the second water pump and finishing the controlling of the operation of the second water pump by comparing the difference value of the temperature of the first coolant and the temperature of the second coolant with the predetermined temperature through the detecting of the temperature of the first coolant circulated in the first cooling apparatus and the temperature of the second coolant in the second cooling apparatus and the determining of when the difference value of the first coolant temperature and the second coolant temperature is higher than the predetermined temperature.

2. The heat pump system for the vehicle of claim 1, wherein the performing of heating of the vehicle interior includes:
   starting, by the controller, the heating of the vehicle in response to an operation or setting by a user during driving of the vehicle;
   operating the compressor of the air conditioning apparatus by the controller; and
   controlling the valve by the controller to open the branch line and to operate the first water pump.

3. The heat pump system for the vehicle of claim 2, wherein, when a heating mode of the vehicle is performed, in a state that the first coolant line is connected to the branch line and the electrical component, the valve is configured to close the first coolant line connected to the first radiator by a control signal of the controller to stop an inflow of a coolant to the first radiator.

4. The heat pump system for the vehicle of claim 1, wherein the detecting of the temperature of the first coolant circulated in the first cooling apparatus and the temperature of the second coolant in the second cooling apparatus and the determining of when the difference value of the first coolant temperature and the second coolant temperature is higher than the predetermined temperature, include:
   detecting the temperatures of the first and second coolants by the controller through an output signal output from first and second coolant temperature sensors; and
   determining when the difference value of the temperature of the first coolant and the temperature of the second coolant is higher than the predetermined temperature.

5. The heat pump system for the vehicle of claim 4, wherein the first coolant temperature sensor detects the temperature of the first coolant circulated in the first cooling apparatus, and
   wherein the second coolant temperature sensor detects the temperature of the second coolant circulated in the second cooling apparatus.

6. The heat pump system for the vehicle of claim 4, wherein when the difference value of the first coolant temperature and the second coolant temperature is determined to be higher than the predetermined temperature, the controlling of the operation of the second water pump and the finishing of the controlling includes maintaining a state in which an operation of the second water pump is interrupted or the operation of the second water pump is stopped or finishing the controlling.

7. The heat pump system for the vehicle of claim 4, wherein when the difference value of the first coolant temperature and the second coolant temperature is equal to or lower than the predetermined temperature, the controlling of the operation of the second water pump and the finishing of the controlling include operating the second water pump.

8. The heat pump system for the vehicle of claim 7, further including,
   in the controlling of the operation of the second water pump and the finishing of the control, after operating the second water pump, operating a cooling fan mounted at a rear of the first radiator or opening an air flap mounted in the vehicle at a front of the second radiator, and returning to the detecting of the temperature of the first coolant circulated in the first cooling apparatus and the temperature of the second coolant in the second cooling apparatus and the determining of when the difference value of the first coolant temperature and the second coolant temperature is higher than the predetermined temperature.

9. The heat pump system for the vehicle of claim 1, wherein, in the heat exchanger accumulates the thermal energy recovered from the first and second coolants inflowing through the first and second coolant lines.

\* \* \* \* \*